US009954752B2

(12) United States Patent
Hayashi et al.

(10) Patent No.: US 9,954,752 B2
(45) Date of Patent: Apr. 24, 2018

(54) TRANSMISSION TERMINAL, COMMUNICATION SYSTEM, COMMUNICATION METHOD, AND PROGRAM

(71) Applicant: NEC CORPORATION, Tokyo (JP)

(72) Inventors: Yuki Hayashi, Tokyo (JP); Jun Suzuki, Tokyo (JP); Masaki Kan, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 84 days.

(21) Appl. No.: 15/027,350

(22) PCT Filed: Oct. 21, 2014

(86) PCT No.: PCT/JP2014/077935
§ 371 (c)(1),
(2) Date: Apr. 5, 2016

(87) PCT Pub. No.: WO2015/060297
PCT Pub. Date: Apr. 30, 2015

(65) Prior Publication Data
US 2016/0254976 A1    Sep. 1, 2016

(30) Foreign Application Priority Data
Oct. 22, 2013  (JP) ................................ 2013-219503

(51) Int. Cl.
*H04L 12/26*    (2006.01)
*H04L 1/18*    (2006.01)
(Continued)

(52) U.S. Cl.
CPC ........ *H04L 43/0864* (2013.01); *H04L 1/0061* (2013.01); *H04L 1/1621* (2013.01);
(Continued)

(58) Field of Classification Search
None
See application file for complete search history.

(56) References Cited

U.S. PATENT DOCUMENTS

2002/0080802 A1    6/2002  Sachs et al.
2006/0251026 A1    11/2006  Kalhan
(Continued)

FOREIGN PATENT DOCUMENTS

JP    2004-517534 A    6/2004
JP    2008-541620 A    11/2008
(Continued)

OTHER PUBLICATIONS

Communication dated Jun. 7, 2017, from the European Patent Office in counterpart European Application No. 14856130.1.
(Continued)

*Primary Examiner* — Diane Lo
(74) *Attorney, Agent, or Firm* — Sughrue Mion, PLLC

(57) ABSTRACT

A communication system is provided with a transmission terminal and a reception terminal that communicate over a network, and the transmission terminal includes: an encoded packet generation unit which encodes a predetermined number of packets and transmits the encoded packets to the reception terminal over the network; a network environment measurement unit which measures the state of the network; and a parameter calculation unit which determines the predetermined number of packets by using a characteristics to be guaranteed in regard to delay time required for a packet transmitted from the transmission terminal to arrive at the reception terminal and the state of the network. In the communication system in which the transmission terminal and the reception terminal communicate via the network on which a packet loss may occur, a characteristic regarding a packet delay time specified by a user is guaranteed.

16 Claims, 9 Drawing Sheets

(51) Int. Cl.
*H04L 1/00* (2006.01)
*H04L 1/16* (2006.01)
*H04L 1/20* (2006.01)

(52) U.S. Cl.
CPC .......... *H04L 1/1678* (2013.01); *H04L 1/1819* (2013.01); *H04L 43/0841* (2013.01); *H04L 43/0894* (2013.01); *H04L 1/203* (2013.01)

(56) References Cited

U.S. PATENT DOCUMENTS

| | | | |
|---|---|---|---|
| 2007/0079222 A1 | 4/2007 | Kure et al. | |
| 2009/0125778 A1 | 5/2009 | Uchida et al. | |
| 2010/0239048 A1 | 9/2010 | Lee et al. | |
| 2013/0136193 A1* | 5/2013 | Hwang | H03M 13/05 375/240.27 |
| 2014/0153637 A1 | 6/2014 | Imai et al. | |

FOREIGN PATENT DOCUMENTS

| | | |
|---|---|---|
| JP | 2009-152864 A | 7/2009 |
| JP | 2010-119133 A | 5/2010 |
| JP | 2010-526477 A | 7/2010 |
| JP | 2011-086982 A | 4/2011 |
| WO | 2007/069406 A1 | 6/2007 |
| WO | 2013046698 A1 | 4/2013 |

OTHER PUBLICATIONS

D.J.C. Mackay, "Fountain codes", IEE Proc.-Commun., Dec. 2005, pp. 1062-1068, vol. 152, No. 6.

International Search Report of PCT/JP2014/077935 dated Jan. 20, 2015 [PCT/ISA/210].

Written Opinion of PCT/JP2014/077935 dated Jan. 20, 2015 [PCT/ISA/237].

* cited by examiner

Fig. 3

USER-SPECIFIED GUARANTEE VALUE TABLE T1

| PARAMETER | USER-SPECIFIED VALUE |
|---|---|
| MAXIMUM ALLOWABLE DELAY | 50 [ms] |
| PROBABILITY OF BEING GUARANTEED | 99 [%] |

Fig. 4

NETWORK STATUS TABLE T2

| PARAMETER | MEASURED VALUE |
|---|---|
| RTT | 1 [ms] |
| LOSS RATE | 5 [%] |
| TRANSMISSION RATE | 10 [Mbps] |
| PACKET SIZE | 100 [byte] |

TRANSMISSION TERMINAL, COMMUNICATION SYSTEM, COMMUNICATION METHOD, AND PROGRAM

CROSS REFERENCE TO RELATED APPLICATIONS

This application is a National Stage of International Application No. PCT/JP2014/077935, filed Oct. 21, 2014, claiming priority based on Japanese Patent Application No. 2013-219503, filed Oct. 22, 2013, the contents of all of which are incorporated herein by reference in their entirety.

TECHNICAL FIELD

The present invention relates to a transmission terminal, a communication system, a communication method, and a program, particularly to a transmission terminal, a communication system, a communication method, and a program for communicating with a reception terminal over a network in which a packet loss may occur.

BACKGROUND ART

"ARQ (Automatic Repeat reQuest)" and "FEC (Forward Error Correction)" are known methods for guaranteeing arrival of packets transmitted from a transmission terminal to a reception terminal over a transmission channel in which a packet loss occurs.

In the ARQ method, packets are given sequence numbers that indicate an order before being transmitted, thereby allowing a reception terminal to detect any packet that is not received at the reception terminal and to issue a retransmission request to the transmission terminal.

In the FEC method, on the other hand, redundant packets are associated with packets to be transmitted and, when there is a packet that is not received at a reception terminal, the redundant packet is used to recover the lost packet. In the FEC method, there is what is called a "rateless code" which allows redundant packets to be limitlessly generated from source packets that are the sources of redundant packets and allows source packets to be decoded from redundant packets at the reception terminal.

FIG. 9 is a block diagram illustrating an exemplary configuration of a communication system according to a related art that uses a rateless code to guarantee arrival of packets. Referring to FIG. 9, the communication system includes a transmission terminal 110 and a reception terminal 120 that communicate over a network 130.

The transmission terminal 110 includes a source packet transmission unit 111 and a rateless code encoder 114. The rateless code encoder 114 includes a transmission buffer 115, an encoded packet generation unit 116, and an ACK reception unit 117. The reception terminal 120, on the other hand, includes a rateless code decoder 121 and a source packet reception unit 125. The rateless code decoder 121 includes a reception buffer 122, an encoded packet reconstruction unit 123, and an ACK generation unit 124.

The communication system in FIG. 9, which uses a rateless code to guarantee arrival of packets, operates as follows.

First, an operation of the transmission terminal 110 will be described.

The source packet transmission unit 111 generates data packets transmitted to the reception terminal 120 and sends the generated packets to the transmission buffer 115 in the rateless code encoder 114. The transmission buffer 115 receives the packets and inserts the received packets in a buffer of the transmission buffer 115 itself. When a maximum allowable number of packets are accumulated in the transmission buffer 115, the transmission buffer 115 sends, to the source packet transmission unit 111, a notification that causes the source packet transmission unit to stop transmitting packets.

The encoded packet generation unit 116 retrieves a predetermined number of source packets from the transmission buffer 115. The encoded packet generation unit 116 encodes the source packets by using a rateless code and transmits the encoded source packets onto the network 130.

Hereinafter, packets encoded using a rateless packet is referred to as an "encoded packet". Examples of known rateless codes include Random Linear Fountain codes and Raptor codes (NPL 1).

The encoded packet generation unit 116 continues generating encoded packets using source packets of the same type and transmitting the packets until the encoded packet generation unit 116 receives an acknowledgement packet from the ACK reception unit 117. When the encoded packet generation unit 116 receives an acknowledgement packet from the ACK reception unit 117, the encoded packet generation unit 116 discards the source packets currently being used and retrieves the predetermined number of next source packets from the transmission buffer 115.

The number of source packets to be encoded by the rateless code encoder 114 at a time can be determined as a parameter.

Next, an operation of the reception terminal 120 will be described.

When the rateless code decoder 121 receives a predetermined number of packets transmitted from the network 130, the rateless code decoder 121 attempts to decode the packets by using a rateless code.

When the decoding is completed, the rateless code decoder 121 sends the decoded packets to the source packet reception unit 125. In addition, the ACK generation unit 124 transmits an arrival acknowledgement packet to the transmission terminal 110. On the other hand, when decoding is not completed, the rateless code decoder 121 waits for new packets from the network 130.

In the communication system illustrated in FIG. 9, "the number of packets" to be encoded by the rateless code encoder 114 is used as a parameter that is set for the purpose of effectively exploiting a network bandwidth. For example, the number of source packets and other parameters used by the rateless code encoder 114 for encoding at transmission of the next packets can be changed by adding network information to an ACK which is transmitted when decoding is completed. In this way, the network bandwidth can be effectively exploited by setting a parameter that is appropriate for the current network state.

CITATION LIST

Patent Literature

[PTL 1] Japanese Laid-open Patent Publication No. 2009-152864

[PTL 2] Japanese Laid-open Patent Publication No. 2010-119133

Non-Patent Literature

[NPL 1] MacKay, D. J. C. "Fountain codes", Published in Communications, IEEE Proceedings, Volume 152, Issue 6.

SUMMARY OF INVENTION

Technical Problem

The disclosures of the patent literatures and the non-patent literature given above are incorporated herein in their entirety by reference. The following analysis is made by the inventors of the present invention.

There is a problem with the communication system according to the related art illustrated in FIG. 9 that the delay between transmission of a source packet from the source packet transmission unit 111 and reception of the source packet at the source packet reception unit 125 may not be kept within a maximum allowable delay. This is because parameters used by the rateless code encoder 114 does not take into account the arrival delay of source packet from the source packet transmission unit 111 to the source packet reception unit 125.

Another problem with the communication system according to the related art is that the system does not operate properly when the delay between transmission of a source packet from the source packet transmission unit 111 and reception of the source packet at the source packet reception unit 125 does not satisfy the allowable delay of the system. This is because a packet arrival delay that can be achieved by the system according to changes in a network state is not taken into consideration.

It is therefore demanded to enable to guarantee characteristics regarding packet delay time specified by a user in a system in which a transmission terminal and a reception terminal communicate over a network on which a packet loss may occur. An object of the present invention is to provide a transmission terminal, a communication system, a communication method, and a program that help meet the demand.

Solution to Problem

A transmission terminal according to a first aspect of the present invention is a transmission terminal that communicates with a reception terminal over a network, the transmission terminal including:

an encoded packet generation unit which encodes a predetermined number of packets and transmits the encoded packets to the reception terminal over the network;

a network environment measurement unit which measures a state of the network; and a parameter calculation unit which determines the predetermined number by using characteristics to be guaranteed in regard to delay time required for a packet transmitted from the transmission terminal to arrive at the reception terminal and the state of the network.

A communication system according to a second aspect of the present invention is provided with a transmission terminal and a reception terminal that communicate over a network, wherein the transmission terminal includes:

an encoded packet generation unit which encodes a predetermined number of packets and transmits the encoded packets to the reception terminal over the network;

a network environment measurement unit which measures a state of the network; and a parameter calculation unit which determines the predetermined number by using characteristics to be guaranteed in regard to delay time required for a packet transmitted from the transmission terminal to arrive at the reception terminal and the state of the network.

A communication method according to a third aspect of the present invention is provided with a transmission terminal that communicates with a reception terminal over a network, which includes the steps of:

encoding a predetermined number of packets and transmitting the encoded packets to the reception terminal over the network;

measuring a state of the network; and determining the predetermined number by using characteristics to be guaranteed in regard to delay time required for a packet transmitted from the transmission terminal to arrive at the reception terminal and the state of the network.

A program according to a fourth aspect of the present invention causes a computer provided in a transmission terminal that communicates with a reception terminal over a network to execute the processes of:

encoding a predetermined number of packets and transmitting the encoded packets to the reception terminal over the network;

measuring a state of the network; and determining the predetermined number by using characteristics to be guaranteed in regard to delay time required for a packet transmitted from the transmission terminal to arrive at the reception terminal and the state of the network.

Note that the program can be provided as a program product stored on a non-transitory computer-readable storage medium.

Advantageous Effect of Invention

A transmission terminal, a communication system, a communication method, and a program according to the present invention enable to guarantee characteristics regarding packet delay time specified by a user in a communication system in which a transmission terminal and a reception terminal communicate over a network on which a packet loss may occur.

BRIEF DESCRIPTION OF DRAWINGS

FIG. 3 is a table illustrating an exemplary user-specified guarantee value table held by a guarantee value input unit;

FIG. 4 is a table illustrating an exemplary network status table held by a network environment measurement unit;

DESCRIPTION OF EMBODIMENTS

Figure 1:
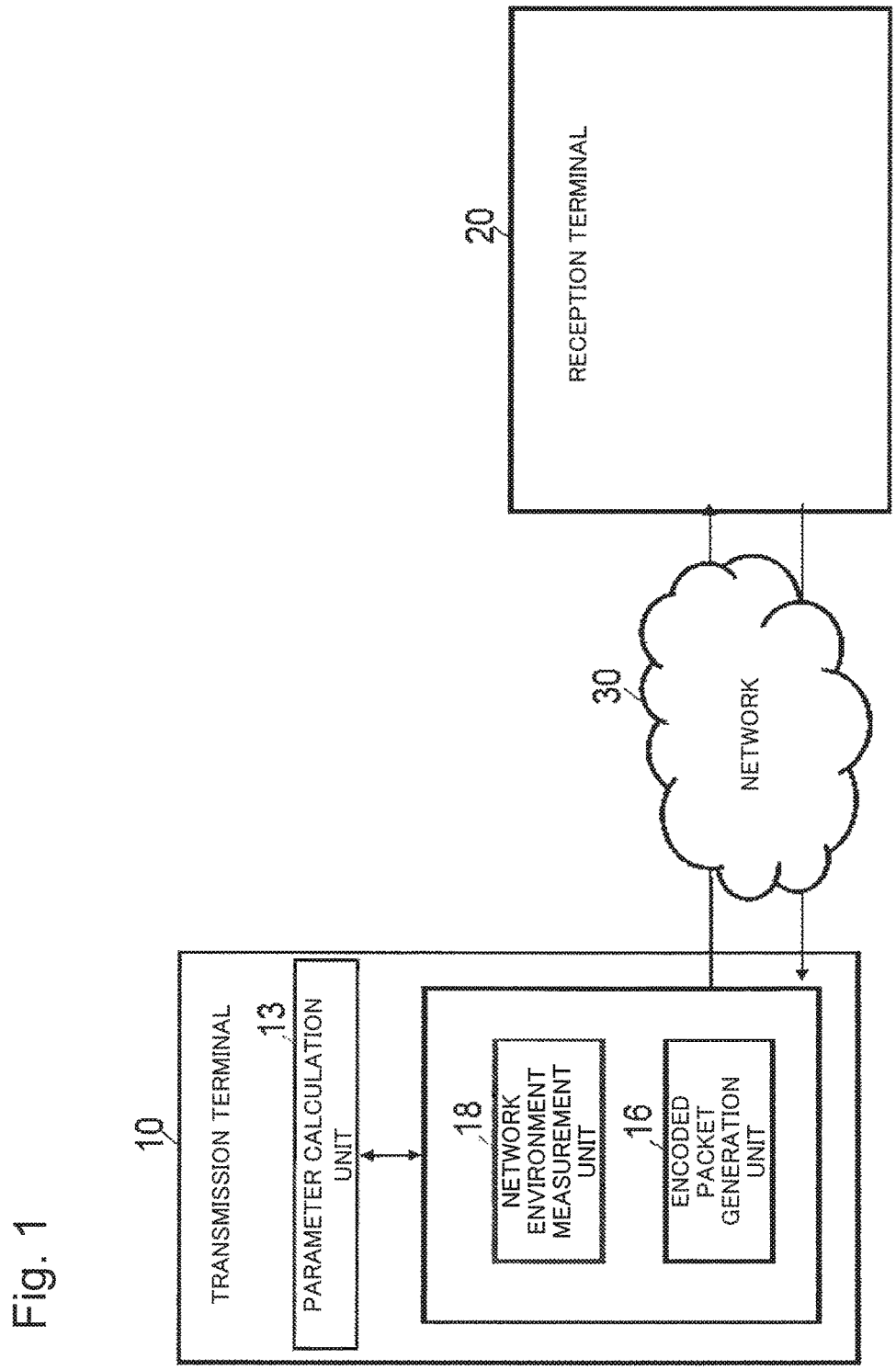
FIG. 1 is a block diagram illustrating an exemplary configuration of a communication system according to one exemplary embodiment.

First, an overview of one exemplary embodiment will be described. Reference numerals given to the drawings used in the overview are intended only to facilitate understanding and are not intended to limit the present invention to the modes illustrated in the drawing.

FIG. 1 is a block diagram illustrating an exemplary configuration of a communication system according to one exemplary embodiment. Referring to FIG. 1, the communication system includes a transmission terminal 10 and a reception terminal 20 that communicate over a network 30.

The transmission terminal 10 includes: an encoded packet generation unit 16 encoding a predetermined number of packets and transmitting the encoded packets to the reception terminal 20 over the network 30; a network environment measurement unit 18 measuring a state of the network 30; and a parameter calculation unit 13 determining the predetermined number of packets by using characteristics to be guaranteed in regard to the delay time required for a packet transmitted from the transmission terminal 10 to arrive at the reception terminal 20 and the state of the network 30.

The encoded packet generation unit 16 may use rateless coding to encode the predetermined number of packets. However, the encoding method in the present invention is not limited to this.

The characteristics to be guaranteed preferably include a maximum allowable delay value, which is the maximum value allowed for the delay time and the probability of the maximum allowable delay being guaranteed. In that case, the parameter calculation unit 13 determines the predetermined number of packets such that the maximum allowable delay value and the probability of the maximum allowable delay value being guaranteed are satisfied.

The network environment measurement unit 18 may measure the round trip time between the transmission terminal 10 and the reception terminal 20, the packet loss rate, the transmission bandwidth, and the packet size. The parameter calculation unit 13 may determine the predetermined number of packets on the basis of the measured round trip time, packet loss rate, transmission bandwidth, and packet size.

When the reception terminal 20 successfully decodes the predetermined number of encoded packets received from the transmission terminal 10, the reception terminal 20 may transmit an acknowledgement packet to the transmission terminal 10. Further, the network environment measurement unit 18 may measure the state of the network using information contained in the acknowledgement packet.

The communication system thus configured is capable of guaranteeing any user-specified value of the delay required between transmission of a packet from the transmission terminal 10 and reception of the packet at the reception terminal. This is because of measuring the network environment by the network environment measurement unit 18, determining a coding parameter that guarantees any user-specified delay value using the information about the measured network environment, and transmitting packets after encoding the packets by the transmission terminal 10 using the determined parameter.

First Exemplary Embodiment

Next, a communication system according to a first exemplary embodiment will be described in detail with reference to the drawings.

[Configuration]

Figure 2:
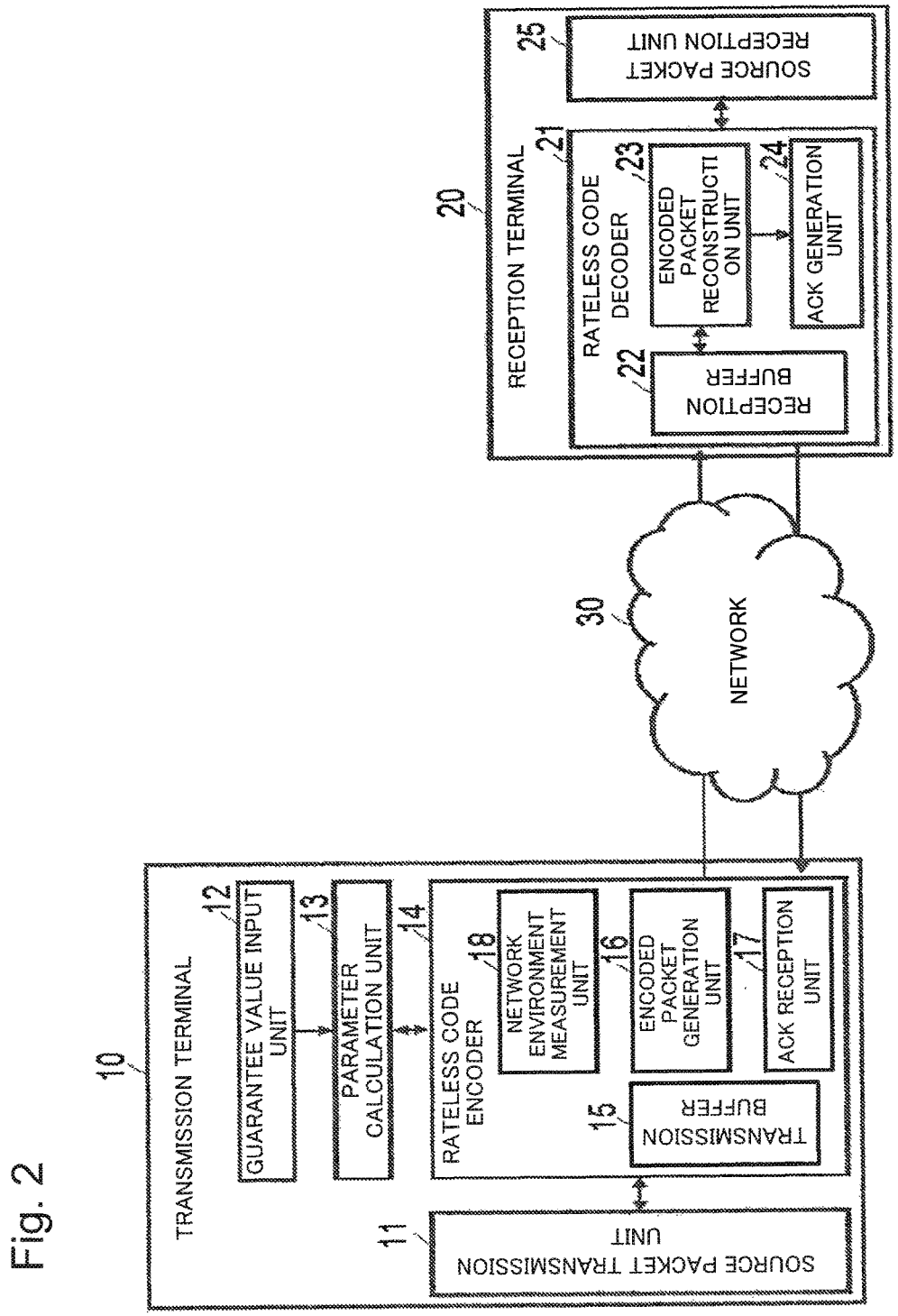
FIG. 2 is a block diagram illustrating an exemplary configuration of a communication system according to a first exemplary embodiment.

FIG. 2 is a block diagram illustrating an exemplary configuration of the communication system according to this exemplary embodiment. Referring to FIG. 2, the communication system includes a transmission terminal 10 that transmits packets and a reception terminal 20 that receives packets. The transmission terminal 10 and the reception terminal 20 are connected with each other over a network 30, which is a transmission channel through which packets are transmitted.

The transmission terminal 10 includes a source packet transmission unit 11, a rateless code encoder 14, a guarantee value input unit 12, and a parameter calculation unit 13. The source packet transmission unit 11 generates packets in the transmission terminal 10. The rateless code encoder 14 encodes source packets and transmits the encoded source packets onto the network 30. The guarantee value input unit 12 accepts a delay time specified by a user. The parameter calculation unit 13 determines a value of a parameter for the rateless code encoder 14 such that the value guarantees the delay time specified by the user.

The guarantee value input unit 12 and the parameter calculation unit 13 may be provided externally to the transmission device 10, provided that the guarantee value input unit 12 and the parameter calculation unit 13 can exchange information with the transmission terminal 10 from outside the transmission terminal 10.

The rateless code encoder 14 includes a transmission buffer 15, an encoded packet generation unit 16, an ACK reception unit 17, and a network environment measurement unit 18. The transmission buffer 15 holds packets received from the source packet transmission unit 11. The encoded packet generation unit 16 retrieves as many packets as the number of packets determined by the parameter calculation unit 13 from the transmission buffer 15, encodes the retrieved packets, and transmits the encoded packets onto the network 30. The ACK reception unit 17 receives an acknowledgement packet from the reception terminal 20. The network environment measurement unit 18 measures the network state and allows the current network state to be reflected in the parameter calculation unit 13.

The reception terminal 20 includes a rateless code decoder 21 and a source packet reception unit 25. The rateless code decoder 21 decodes encoded packets into source packets. The source packet reception unit 25 receives decoded source packets.

The rateless code decoder 21 includes a reception buffer 22, an encoded packet reconstruction unit 23, and an ACK generation unit 24. The reception buffer 22 holds encoded packets arrived from the network 30. The encoded packet reconstruction unit 23 attempts to decode the packets held in the reception buffer 22 and transmits decoded source packets to the source packet reception unit 25. The ACK generation unit 24 transmits an acknowledgement packet that notifies the transmission terminal 10 that received encoded packets are successfully decoded.

FIG. 3 illustrates an exemplary user-specified guarantee value table T1 held by the guarantee value input unit 12. Referring to FIG. 3, the guarantee value input unit 12 contains "maximum allowable delay" and "probability of being guaranteed" as items of the user-specified guarantee value table T1. The information held in the user-specified guarantee value table T1 is parameters externally input on the basis of any given request from a user.

FIG. 4 illustrates an exemplary network status table T2 held by the network environment measurement unit 18. Referring to FIG. 4, the network environment measurement unit 18 holds "Round Trip Time (RTT)", "packet loss rate", "transmission bandwidth (transmission rate)", and "packet size" as items of the network status table T2. The information held in the network environment measurement unit 18 is generated by using information in an acknowledgement packet and information about transmission from the transmission terminal 10.

Next, operations of the units provided in the transmission terminal 10 will be described in detail.

The source packet transmission unit 11 packetizes data that the transmission terminal 10 wants to transmit and sends the packetized data to the rateless code encoder 14. At the same time, the source packet transmission unit 11 adds a timestamp to the header of each packet to be transmitted and activates a packet timeout timer.

When a user inputs a "maximum allowable delay" and a "probability of being guaranteed", the guarantee value input unit 12 updates the values in the user-specified guarantee value table T1. When the values in the user-specified guarantee value table T1 are updated, the updated table values is sent to the parameter calculation unit 13.

The parameter calculation unit 13 inputs the parameters in the user-specified guarantee value table T1 received from the guarantee value input unit 12 and the parameters in the network status table T2 received from the rateless code encoder 14 into delay guaranteeing formulas, which will be described later, to determine "the number of source packets to be encoded at a time" by the rateless code encoder 14. The parameter calculation unit 13 sends the determined "number of source packets to be encoded at a time" to the rateless code encoder 14.

A concrete example of a method for calculating delay guaranteeing parameters will be described after the description for each of the units.

The rateless code encoder 14 uses a rateless code to encode packets sent from the source packet transmission unit 11 and transmits the encoded packets onto the network 30. The rateless code encoder 14 encodes as many packets as "the number (K) of source packets to be encoded at a time" calculated by the parameter calculation unit 13 at a time on the basis of the rateless code.

Figure 5:
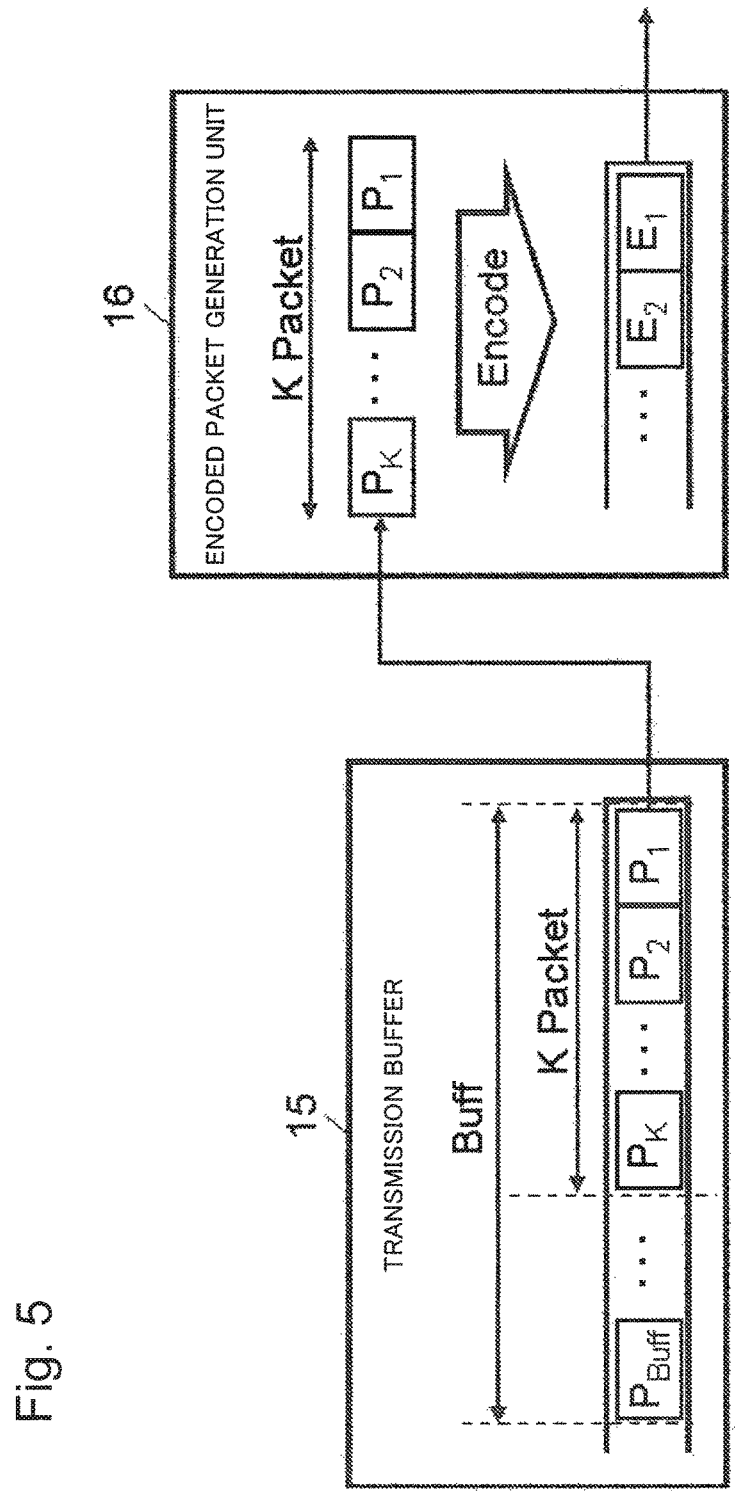
FIG. 5 is a block diagram illustrating an exemplary flow of packets from a transmission buffer to an encoded packet generation unit.

Next, operations of the units in the rateless code encoder 14 will be described in detail. FIG. 5 is a block diagram illustrating details of an example of flow of packets from the transmission buffer 15 to the encoded packet generation unit 16 in the transmission terminal 10 of this exemplary embodiment.

When the transmission buffer 15 receives a packet sent from the source packet transmission unit 11, the transmission buffer 15 inserts the packet in the transmission buffer 15 itself. When the number of packets inserted reaches a maximum buffer capacity (the maximum value: Buff), the transmission buffer 15 sends a message for causing the source packet transmission unit 11 to stop sending packets.

The encoded packet generation unit 16 retrieves, from the transmission buffer 15, as many packets as "the number (K) of packets to be encoded at a time", $P_1$ to $P_k$, calculated by the parameter calculation unit 13 and encodes the packets using a rateless code. The encoded packet generation unit 16 adds "the number of used source packets", "the maximum sequence number of used source packets", an "encoded packet sequence number", and a "timestamp" to the header of each of the encoded packets and transmits the encoded packets, $E_1, E_2, \ldots$, onto the network 30.

When the encoded packet generation unit 16 receives information indicating the arrival of an acknowledgement packet from the ACK reception unit 17, the encoded packet generation unit 16 determines that the transmission of source packets currently being used for encoding is completed. The encoded packet generation unit 16 then discards the source packets currently being used for the encoding and resets the "encoded packet sequence numbers". Subsequently, the encoded packet generation unit 16 retrieves as many packets as "the number (K) of packets to be encoded at a time" from the transmission buffer 15 and encodes the packets.

The encoded packet generation unit 16 generates encoded packets by using a rateless code to encode as many source packets as "the number (K) of source packets to be encoded at a time". Rateless code is a method that generates a limitless number of encoded packets for a certain number of source packets; when a certain number of encoded packets are received at the reception terminal 20, the encoded packets can be decoded to reconstruct the source packets. Specific examples of the known rateless codes include Random Linear Fountain codes and Raptor codes (NPL 1).

When the ACK reception unit 17 receives an acknowledgement packet from the reception terminal 20, the ACK reception unit 17 sends information indicating the reception of the acknowledgement packet to the encoded packet generation unit 16. The acknowledgement packet contains "the number of received encoded packets", "the maximum sequence number of received encoded packets", "the maximum sequence number of used source packets", a "timestamp", and "the number of lost packets". When the ACK reception unit 17 receives the acknowledgement packet, the ACK reception unit 17 sends the information contained in the acknowledgement packet to the network environment measurement unit 18.

When the network environment measurement unit 18 receives an acknowledgement packet from the ACK reception unit 17, the network environment measurement unit 18 calculates a "packet loss rate" and a "round trip time (RTT)". The "packet loss rate" can be calculated as: "number of lost packets"÷"maximum sequence number of received encoded packets". The "round trip time" can be calculated as: "time of reception of ACK"−"time of transmission of maximum sequence number of received encoded packets".

The network environment measurement unit 18 obtains intervals of packets sent from the encoded packet generation unit 16 and measures a "transmission bandwidth".

The network environment measurement unit 18 calculates "the packet loss rate", "the round trip time", and "the transmission bandwidth" at certain intervals, and sends the information to the parameter calculation unit 13. For example, the certain intervals described here may be every time the number of received acknowledgement packets (ACK) reaches N.

Next, units provided in the reception terminal 20 will be described in detail.

The source packet reception unit 25 receives received reconstructed source packets from the rateless code decoder 21. The source packet reception unit 25 acquires data from the packets.

The rateless code decoder 21 receives encoded packets over the network 30. The rateless code decoder 21 uses the received encoded packets to decode as many source packets as "the number of used source packets", which is indicated in a packet header. Upon completion of the decoding, the rateless code decoder 21 transmits an acknowledgement packet to the transmission terminal 10 and sends the decoded source packets to the source packet reception unit 25.

Next, units provided in the rateless code decoder 21 will be described in detail.

When the reception buffer 22 receives an encoded packet over the network 30, the reception buffer 22 inserts the received packet in the reception buffer 22 itself. The reception buffer 22 notifies the encoded packet reconstruction unit 23 of the reception of the packet.

When the encoded packet reconstruction unit 23 receives, from the reception buffer 22, information indicating that the reception buffer 22 has received an encoded packet, the encoded packet reconstruction unit 23 attempts to decode the encoded packet held in the reception buffer 22. When the encoded packet reconstruction unit 23 fails to decode the packets, the encoded packet reconstruction unit 23 discontinues the operation. On the other hand, when the encoded packet reconstruction unit 23 successfully decodes the encoded packet, the encoded packet reconstruction unit 23 discards the encoded packet held in the reception buffer 22 and sends the decoded source packet to the source packet reception unit 25. The encoded packet reconstruction unit 23 then notifies the ACK generation unit 24 of information indicating that the encoded packet is successfully decoded.

When the ACK generation unit 24 receives information indicating that encoded packets are successfully encoded from the encoded packet reconstruction unit 23, the ACK generation unit 24 generates an acknowledgement packet and transmits the acknowledgement packet to the transmission terminal 10. The ACK generation unit 24 adds, to the header of the acknowledgement packet, a "sequence number of the encoded packet received immediately before completion of decoding", "the number of encoded packets actually received", and a "timestamp value added to the header of the encoded packet received immediately before completion of the decoding".

Next, a method for calculating a delay guaranteeing parameter performed by the parameter calculation unit 13 will be described in detail with reference to FIGS. 3, 4 and 5.

Delay time considered here is the difference between the time at which the source packet transmission unit 11 of the transmission terminal 10 sends a packet and the time at which the source packet reception unit 25 of the reception terminal 20 receives the packet. The parameter calculation unit 13 calculates a probability distribution function for the delay time and substitutes "maximum allowable delay" and "probability of being guaranteed" input by a user into the probability distribution function to obtain "the number (K) of source packets to be encoded at a time", which is a parameter of a rateless code.

The time required for the last packet in the transmission buffer 15 to arrive at the source packet reception unit 25 when the maximum number (Buff) of packets are held in the transmission buffer 15 is the maximum delay time experienced by a source packet. Accordingly, a probability distribution function for the time between the arrival of the last packet ($P_{Buff}$) in the transmission buffer 15 at the transmission buffer 15 and the arrival of $P_{Buff}$ at the source packet reception unit 25 may be obtained as a delay time probability distribution function.

The rateless code encoder 14 retrieves as many as source packets as "the number (K) of source packets to be encoded at a time" from the transmission buffer 15, generates encoded packets, transmits the encoded packets to the reception terminal 20, and receives, from the reception terminal 20, an acknowledgement packet indicating that K packets ($P_1$ to $P_k$) are successfully received. The rateless code encoder 14 then retrieves the next K packets ($P_{k+1}$ to $P_{k+k}$) from the transmission buffer 15. Therefore, the delay when the operation of transmitting K packets are performed [Buff÷K] times is the delay that the packet $P_{Buff}$ experiences. Here, [ ] represents a floor function.

The following are formulas for guaranteeing delay when the operation of transmitting and receiving as many source packets as "the number (K) of source packets to be encoded at a time" is performed by the rateless code encoder 14 and the rateless code decoder 21 for [Buff÷K] times.

$$T \leq \frac{S * Packetsize}{Bandwidth} + RTT * [Buff \div K] \qquad \text{Eq. (1)}$$

$$P(S) = \int_{-\infty}^{S} [p(x)]^{\lfloor Buff \div K \rfloor} dx \qquad \text{Eq. (2)}$$

$$p(x) = \binom{x}{K} p^K (1-p)^{x-K} \qquad \text{Eq. (3)}$$

where $$p = 1 - (1 - p_{code}) * (1 - p_{Link})$$

In Eq. (1), T represents "the maximum allowable delay", S represents "the number of encoded packets required before the completion of transmission of the last packet in the transmission buffer 15", Bandwidth represents the "transmission bandwidth", RTT represents the "round trip time", Buff represents the "maximum transmission buffer capacity", and K represents "the number of packets used by the rateless code encoder 14".

Eq. (2) is a formula defined within the range of S in Eq. (1). In Eq. (2), p(x) represents the "probability density function defining the probability of K source packets being decoded at the reception terminal 20 when a packet loss rate and the number of redundant packets required for rateless code are given and x encoded packets are transmitted from the transmission terminal 10". $[p(x)]^{[Buff \div K]}$ represents a "[Buff÷K]-fold convolution integral of p(x)". P(S) represents a "cumulative distribution function defining the probability that all packets, including the last packet, being decoded when S encoded packets are transmitted from the transmission terminal 10".

Eq. (3) yields p(x) in Eq. (2). In Eq. (3), p represents the "decoded packet loss rate that takes into account the packet loss rate and the number of redundant coded packets". $p_{code}$ represents "the number of redundant coded packets of the coding method used in this system (a fixed value according to the coding method). $P_{Link}$ represents the "packet loss rate". x represents "the number of encoded packets required for decoding K source packets".

The parameter calculation unit 13 substitutes the "maximum allowable delay (T)" and the "probability of being guaranteed (P(S))" sent from the guarantee value input unit 12 into Eq. (1) to Eq. (3). The parameter calculation unit 13 also substitutes the "round trip time (RTT)", the "packet loss rate (a parameter used in p(x))" and the "transmission bandwidth (Bandwidth)" sent from the network environment measurement unit 18 into Eq. (1) to Eq. (3). With this substitution, the parameter calculation unit 13 determines "the number (K) of source packets to be encoded at a time" to be retrieved by the encoded packet generation unit 16 in the rateless code encoder 14 from the transmission buffer 15, and sends the determined number (K) to the rateless code encoder 14.

Note that substituting the values given above into Eq. (1) to Eq. (3) may fail to meet a user-specified "maximum allowable delay" and "probability of being guaranteed". Specifically, it is possible that K to be substituted into Eq. (2) in order to meet S in Eq. (1) cannot be obtained. In that case, the parameter calculation unit 13 changes a value in the guarantee value input unit 12 to a value that meets the delay guarantee formulas or stops the operation of the transmission terminal 10.

[Operation]

Figure 6:
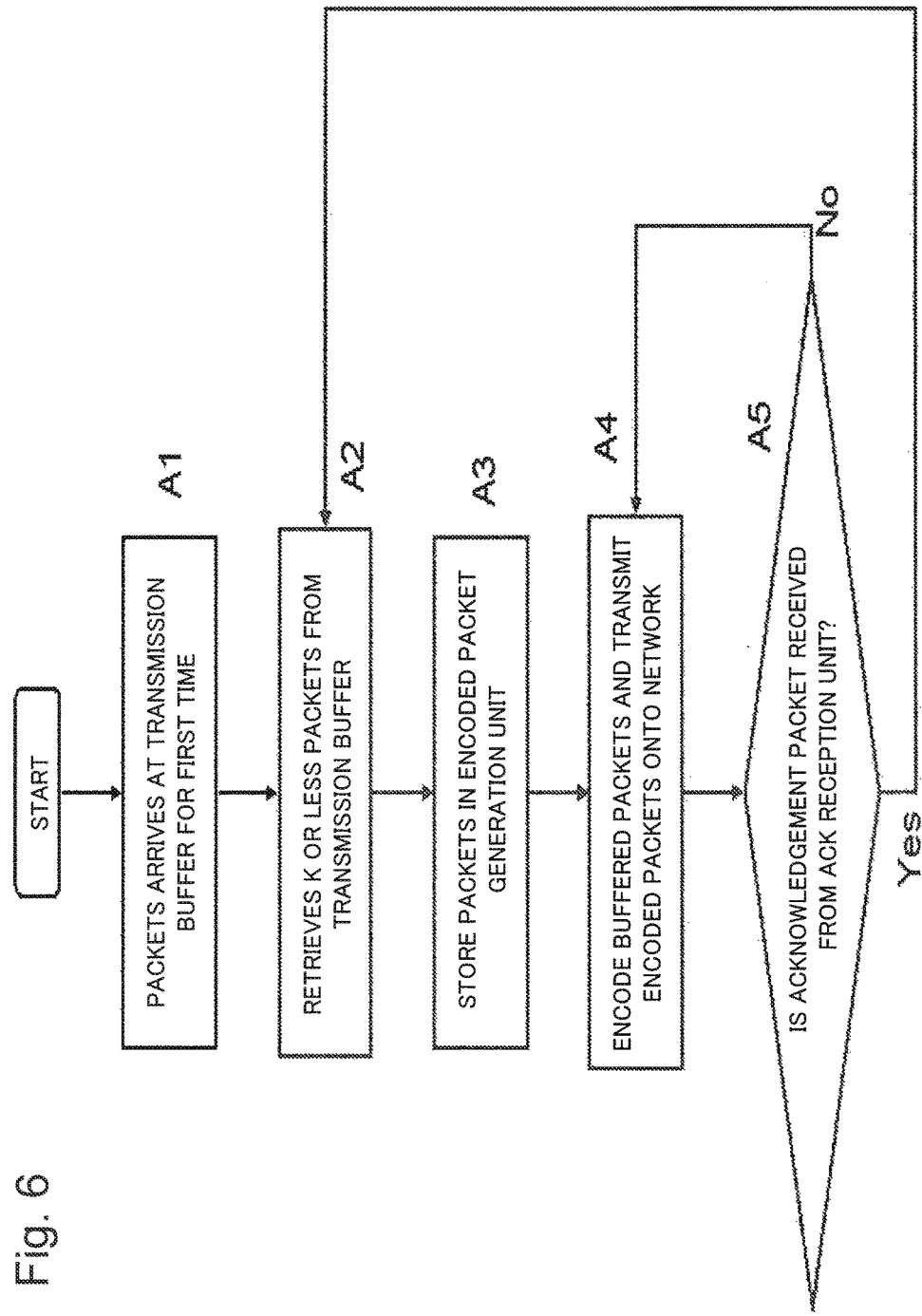
FIG. 6 is a flowchart illustrating an exemplary operation of a rateless code encoder.

Next, referring to FIGS. 2 and 6, an operation of this exemplary embodiment will be described in detail in which packets are sent from the source packet transmission unit 11 in the transmission terminal 10 and encoded packets are sent in the rateless code encoder 14.

First, at Step A1, which is the first occasion on which the transmission terminal 10 starts to transmit packets, the transmission buffer 15 receives a source packet sent from the source packet transmission unit 11.

Then, at Step A2, the encoded packet generation unit 16 retrieves K source packets from among the source packets accumulated in the transmission buffer 15, starting with the first source packet buffered. Note that when the transmission buffer 15 holds less than K source packets, the encoded packet generation unit 16 retrieves all of the source packets from the transmission buffer. Here, K is "the number (K) of source packets to be encoded at a time", which is calculated by the parameter calculation unit 13 described previously.

Then, at Step A3, the source packets retrieved at Step A2 are stored in the encoded packet generation unit 16.

Then, at Step A4, the encoded packet generation unit 16 uses the source packets retrieved at Step A3 to generate encoded packets and transmits the encoded packets onto the network 30. The encoded packet generation unit 16 adds the following information to the header of each encoded packet: "packet transmission time", an "encoded packet sequence number", "the number of source packets used", and "the maximum sequence number of the source packets used".

Then at Step A5, the ACK reception unit 17 determines whether the ACK reception unit 17 has received an acknowledgement packet from the reception terminal 20. When the ACK reception unit 17 has not received an acknowledgement packet (No at Step A5), the operation proceeds to Step A4, where the encoded packet generation unit 16 uses the same source packets again to generate encoded packets and transmits the encoded packets onto the network 30. On the other hand, when the ACK reception unit 17 has received an acknowledgement packet (Yes at Step A5), the encoded packet generation unit 16 discards the source packets currently stored and the operation proceeds to Step A2.

Figure 7:
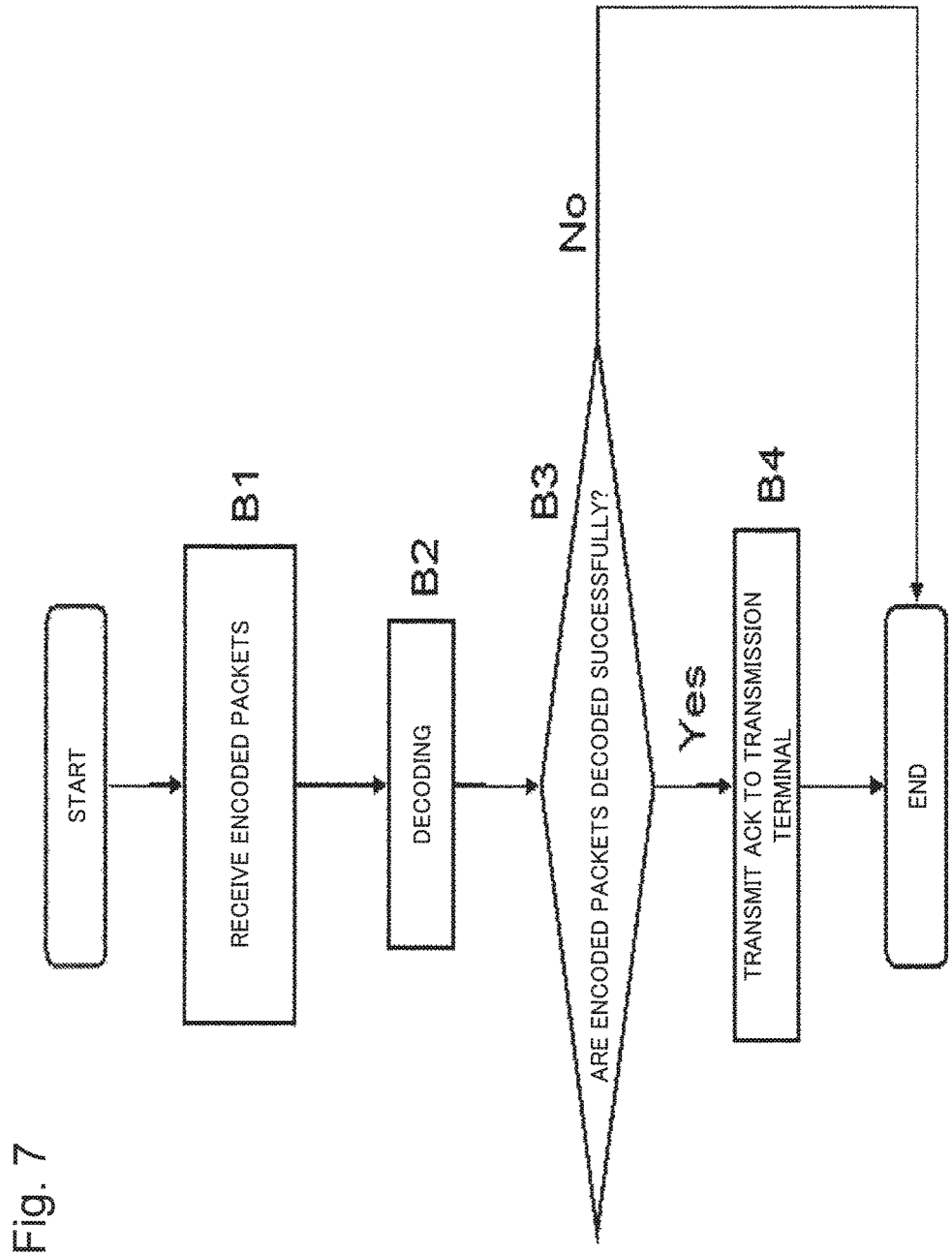
FIG. 7 is a flowchart illustrating an exemplary operation of a rateless code decoder.

Next, referring to FIGS. 2 and 7, an operation will be described in detail in which the rateless code decoder 21 in the reception terminal 20 of this exemplary embodiment receives encoded packets and sends source packets to the source packet reception unit 25.

First, at Step B1, the reception buffer 22 receives encoded packets over the network 30 and inserts the encoded packets in the reception buffer 22 itself. When the number of packets inserted in the buffer reaches or exceeds "the number of source packets used" which is indicated in the header of an encoded packet, the operation proceeds to Step B2.

Then, at Step B2, the encoded packet reconstruction unit 23 performs decoding by using all of the packets in the reception buffer 22. The encoded packet reconstruction unit 23 uses a decoding method based on the rateless code used in this exemplary embodiment.

Then, at Step B3, the encoded packet reconstruction unit 23 determines whether the source packets are successfully decoded by the decoding at Step B2. When the source packets are successfully decoded (Yes at Step B3), the encoded packet reconstruction unit 23 sends the decoded source packets to the source packet reception unit 25 and the operation proceeds to Step B4. On the other hand, when the packets are not successfully decoded (No at Step B3), the operation of the encoded packet reconstruction unit 23 is terminated. Note that when the reception buffer 22 receives a next encoded packet, the determination restarts from Step B1.

At Step B4, the ACK generation unit 24 transmits an acknowledgement packet notifying the transmission terminal 10 of the completion of reception of the source packets currently transmitted from the transmission terminal 10. The ACK generation unit 24 adds, to the header of the acknowledgement packet, a "sequence number of the encoded packet received immediately before the completion of the decoding", "the number of encoded packets actually received", and a "timestamp value added to the header of the encoded packet received immediately before the completion of the decoding".

Figure 8:
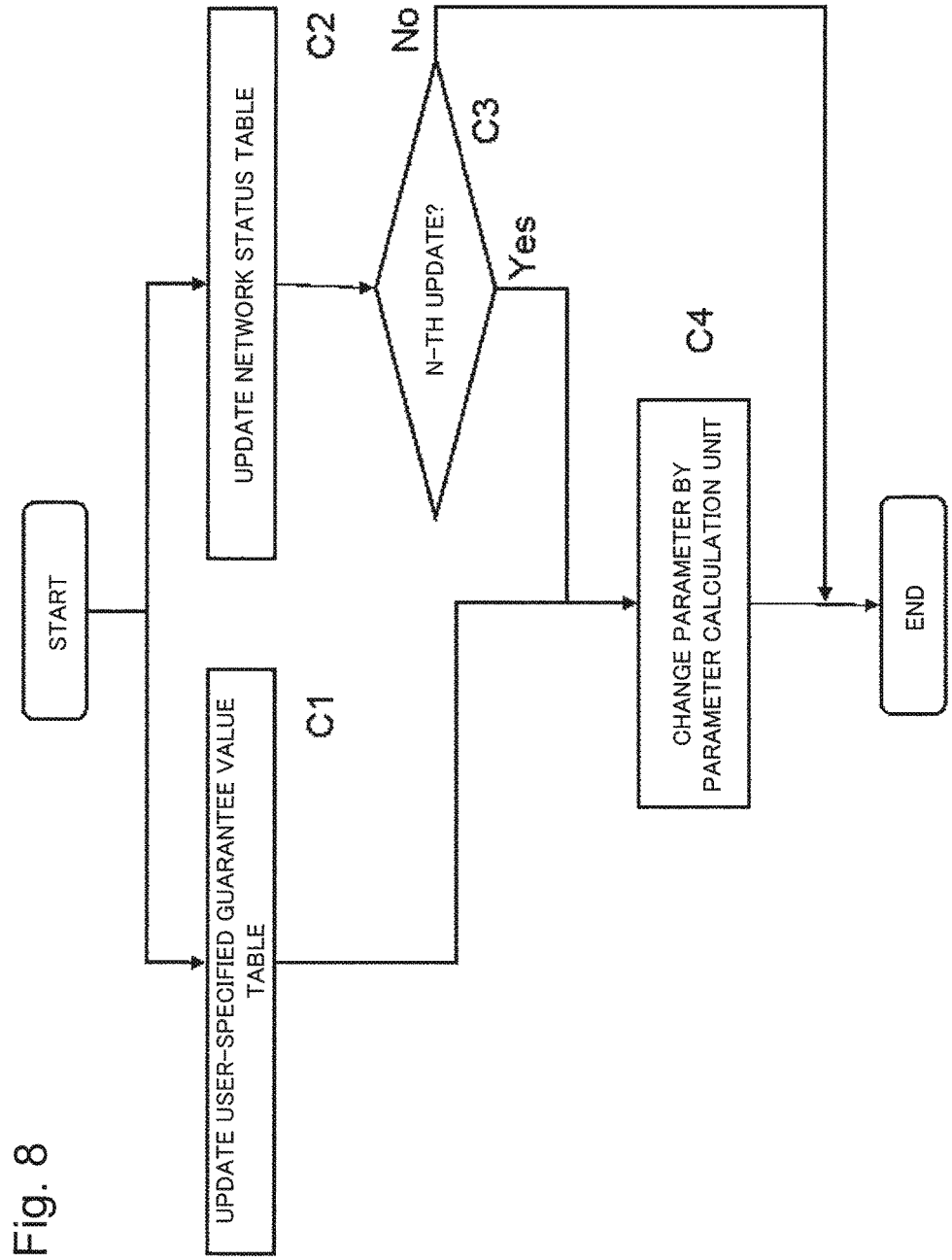
FIG. 8 is a flowchart illustrating exemplary operations of a guarantee value input unit, a network environment measurement unit, and a parameter calculation unit.
Figure 9:
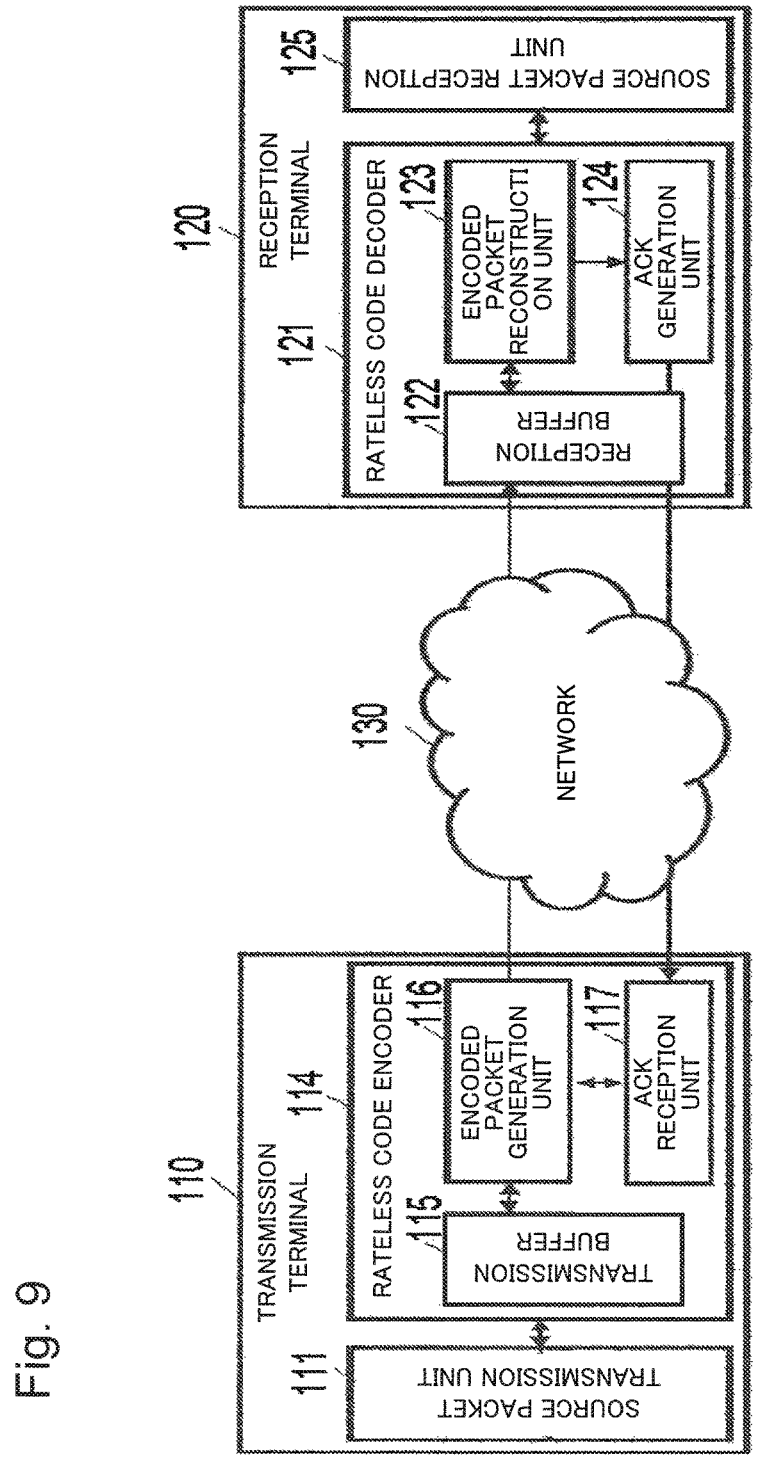
FIG. 9 is a block diagram illustrating an exemplary configuration of a communication system according to a related art.

Next, an operation of the parameter calculation unit 13 will be described in detail referring to FIGS. 2 and 8, in which values of the guarantee value input unit 12 and the network environment measurement unit 18 in the transmission terminal 10 of this exemplary embodiment are updated.

First, when the guarantee value input unit 12 updates the user-specified guarantee value table T1 at Step C1, the operation proceeds to step C4. Specifically, the guarantee value input unit 12 accepts the "maximum allowable delay" and "probability of being guaranteed" given in FIG. 3 as input information from the user.

When the network environment measurement unit 18 updates the network status table T2 at Step C2, the operation proceeds to Step C3. Specifically, the network environment measurement unit 18 inputs the "RTT", "packet loss rate", "transmission bandwidth", and "packet size" given in FIG. 4 into the network status table T2.

Then, at Step C3, the number of times the network status table T2 is updated is counted and, when it is the N-th update (Yes at Step C3), the parameter calculation unit 13 proceeds to Step C4; otherwise, the parameter calculation unit 13 terminates the process without performing any operation. The number of updates, N, may be a parameter that can be changed at the discretion of a system operator.

Then, at Step C4, the parameter calculation unit 13 calculates the delay guaranteeing formulas on the basis of the input table values and updates "the number (K) of packets used in encoding" to be used by the rateless code encoder 14. The updated "number (K) of packets" is a parameter to be used when proceeding to Step A2 of FIG. 6 after the update.

The communication system according to this exemplary embodiment is capable of guaranteeing a given user-specified value of the delay required between transmission of a packet from the source packet transmission unit 11 in the transmission terminal 10 and reception of the packet at the source packet reception unit 25 in the reception terminal 20. This is because the rateless code encoder 14 measures the network environment, the resulting information is used to determine a parameter for rateless coding that guarantees the given user-specified delay value, and the transmission terminal 10 uses the parameter to transmit packets.

Further, the communication system according to this exemplary embodiment is capable of recognizing in advance that the system may fail to operate properly when a delay required for a packet transmitted from the source packet transmission unit 11 in the transmission terminal 10 to arrive at the source packet reception unit 25 in the reception unit 20 does not meet the maximum delay of the system. This is because the system calculates a delay value that the system can guarantee according to changes in the network state.

The following modes of the present invention are possible.

[Mode 1]

A transmission terminal according to the first aspect described previously.

[Mode 2]

The transmission terminal according to Mode 1, wherein the characteristics to be guaranteed include a maximum allowable delay value that is a maximum value allowed for the delay time and the probability of the maximum allowable delay value being guaranteed; and the parameter calculation unit determines the predetermined number of packets such that the maximum allowable delay value and the probability of the maximum allowable delay value being guaranteed are satisfied.

[Mode 3]

The transmission terminal according to Mode 1 or 2, wherein the network environment measurement unit measures a packet round trip time between the transmission terminal and the reception terminal, a packet loss rate, a transmission bandwidth, and a packet size; and the parameter calculation unit determines the predetermined number of packets based on the measured round trip time, packet loss rate, transmission bandwidth, and packet size.

[Mode 4]

The transmission terminal according to any one of Modes 1 to 3, wherein the reception terminal transmits an acknowledgement packet to the transmission terminal when the reception terminal successfully decodes the predetermined number of encoded packets received from the transmission terminal; and the network environment measurement unit uses information contained in the acknowledgement packet to measure the state of the network.

[Mode 5]

The transmission terminal according to any one of Modes 1 to 4, wherein the encoded packet generation unit encodes the predetermined number of packets by using rateless coding.

[Mode 6]

A communication system according to the second aspect described previously.

[Mode 7]

The communication system according to Mode 6, wherein the characteristics to be guaranteed include a maximum allowable delay value that is a maximum value allowed for the delay time and the probability of the maximum allowable delay value being guaranteed; and the parameter calculation unit determines the predetermined number of packets such that the maximum allowable delay value and the probability of the maximum allowable delay value being guaranteed are satisfied.

[Mode 8]

The communication system according to Mode 6 or 7, wherein the network environment measurement unit measures a packet round trip time between the transmission terminal and the reception terminal, a packet loss rate, a transmission bandwidth, and a packet size; and the parameter calculation unit determines the predetermined number of packets based on the measured round trip time, packet loss rate, transmission bandwidth, and packet size.

[Mode 9]

The communication system according to any one of Modes 6 to 8, wherein the reception terminal transmits an acknowledgement packet to the transmission terminal when the reception terminal successfully decodes the predetermined number of encoded packets received from the transmission terminal; and the network environment measurement unit uses information contained in the acknowledgement packet to measure the state of the network.

[Mode 10]

A communication method according to the third aspect described previously.

[Mode 11]

The communication method according to Mode 10, wherein the characteristics to be guaranteed include a maximum allowable delay value that is a maximum value allowed for the delay time and the probability of the maximum allowable delay value being guaranteed; and in the step of determining, the predetermined number of packets is determined such that the maximum allowable delay value and the probability of the maximum allowable delay value being guaranteed are satisfied.

[Mode 12]

The communication method according to Mode 10 or 11, wherein, in the step of measuring, a packet round trip time between the transmission terminal and the reception terminal, a packet loss rate, a transmission bandwidth, and a packet size are measured; and in the step of determining, the predetermined number of packets is determined based on the measured round trip time, packet loss rate, transmission bandwidth, and packet size.

[Mode 13]

The communication method according to any one of Modes 10 to 12, further including the step of transmitting an acknowledgement packet from the reception terminal to the transmission terminal when the reception terminal successfully decodes the predetermined number of encoded packets received from the transmission terminal;

wherein, in the step of measuring, the state of the network is measured by using information contained in the acknowledgement packet.

[Mode 14]

The communication method according to any one of Modes 10 to 13, wherein, in the step of transmitting, the predetermined number of packets are encoded by using rateless coding.

[Mode 15]

A program according to the fourth aspect described previously.

[Mode 16]

The program according to Mode 15, wherein the characteristics to be guaranteed include a maximum allowable delay value that is a maximum value allowed for the delay time and the probability of the maximum allowable delay value being guaranteed; and in the step of determining, the predetermined number of packets is determined such that the maximum allowable delay and the probability of the maximum allowable delay value being guaranteed are satisfied.

[Mode 17]

The program according to Mode 15 or 16, wherein, in the step of measuring, a packet round trip time between the transmission terminal and the reception terminal, a packet loss rate, a transmission bandwidth, and a packet size are measured; and in the step of determining, the predetermined number of packets is determined based on the measured round trip time, packet loss rate, transmission bandwidth, and packet size.

[Mode 18]

The program according to any one of Modes 15 to 17, wherein the reception terminal transmits an acknowledgement packet to the transmission terminal when the reception terminal successfully decodes the predetermined number of encoded packets received from the transmission terminal; and in the step of measuring, the state of the network is measured by using information contained in the acknowledgement packet.

[Mode 19]

The program according to any one of Modes 15 to 18, wherein, in the step of transmitting, the predetermined number of packets are encoded by using rateless coding.

Note that the disclosed contents of the patent literatures and the non-patent literature cited earlier are incorporated herein by reference in their entirety. Changes and adjustments can be made to the exemplary embodiments within the entire disclosure of the present invention (including Claims) and on the basis of the basic technical idea of the present invention. Furthermore, various combinations or selections of disclosed elements (including the elements of each of Claims, elements of each of the exemplary embodiments, and elements of each of the drawings) are possible within the scope of the Claims of the present invention. In other words, it would be understood that the entire disclosure, including the Claims, variations and modifications that can be made by those skilled in the art in accordance with the technical idea are fall within the scope of the present invention. In particular, regarding to numerical ranges recited herein, any numerical values and subranges that are encompassed within the numerical ranges should be interpreted that each numerical value and subrange are explicitly recited even when they are not explicitly recited.

REFERENCE SIGNS LIST 10, 110 Transmission terminal
11, 111 Source packet transmission unit
12 Guarantee value input unit
13 Parameter calculation unit
14, 114 Rateless code encoder
15, 115 Transmission buffer
16, 116 Encoded packet generation unit
17, 117 ACK reception unit
18 Network environment measurement unit
20, 120 Reception terminal
21, 121 Rateless code decoder
22, 122 Reception buffer
24, 124 ACK generation unit
25, 125 Source packet reception unit
30, 130 Network
$E_1$, $E_2$ Encoded packet
$P_1$-$P_{Buff}$ Source packet
T1 User-specified guarantee value table
T2 Network status table

The invention claimed is:

1. A transmission terminal that communicates with a reception terminal over a network, the transmission terminal comprising:

a processor configured to execute:

an encoded packet generation unit which encodes a predetermined number of packets and transmits the encoded packets to the reception terminal over the network;

a network environment measurement unit which measures a state of the network; and a parameter calculation unit which determines the predetermined number by using characteristics to be guaranteed in regard to delay time required for a packet transmitted from the transmission terminal to arrive at the reception terminal and the state of the network, wherein the characteristics to be guaranteed include a maximum allowable delay value that is a maximum value allowed for the delay time and a probability of the maximum allowable delay value being guaranteed, and wherein the parameter calculation unit determines the predetermined number of packets such that the maximum allowable delay value and the probability of the maximum allowable delay value being guaranteed are satisfied.

2. The transmission terminal according to claim 1, wherein the network environment measurement unit measures a packet round trip time between the transmission terminal and the reception terminal, a packet loss rate, a transmission bandwidth, and a packet size; and the parameter calculation unit determines the predetermined number of packets based on the measured round trip time, packet loss rate, transmission bandwidth, and packet size.

3. The transmission terminal according to claim 1, wherein the reception terminal transmits an acknowledgement packet to the transmission terminal when the reception terminal successfully decodes the predetermined number of encoded packets received from the transmission terminal; and the network environment measurement unit uses information contained in the acknowledgement packet to measure the state of the network.

4. The transmission terminal according to claim 1, wherein the encoded packet generation unit encodes the predetermined number of packets by using rateless coding.

5. A communication system provided with a transmission terminal and a reception terminal that communicate over a network, wherein the transmission terminal comprises:

a processor configured to execute:

an encoded packet generation unit which encodes a predetermined number of packets and transmits the encoded packets to the reception terminal over the network;

a network environment measurement unit which measures a state of the network; and a parameter calculation unit which determines the predetermined number by using characteristics to be guaranteed in regard to delay time required for a packet transmitted from the transmission terminal to arrive at the reception terminal and the state of the network, wherein the characteristics to be guaranteed include a maximum allowable delay value that is a maximum value allowed for the delay time and a probability of the maximum allowable delay value being guaranteed, and wherein the parameter calculation unit determines the predetermined number of packets such that the maximum allowable delay value and the probability of the maximum allowable delay value being guaranteed are satisfied.

6. The communication system according to claim 5, wherein the network environment measurement unit measures a packet round trip time between the transmission terminal and the reception terminal, a packet loss rate, a transmission bandwidth, and a packet size; and the parameter calculation unit determines the predetermined number of packets based on the measured round trip time, packet loss rate, transmission bandwidth, and packet size.

7. The communication system according to claim 5, wherein the reception terminal transmits an acknowledgement packet to the transmission terminal when the reception terminal successfully decodes the predetermined number of encoded packets received from the transmission terminal; and the network environment measurement unit uses information contained in the acknowledgement packet to measure the state of the network.

8. The communication system according to claim 5, wherein the encoded packet generation unit encodes the predetermined number of packets by using rateless coding.

9. A communication method by a transmission terminal that communicates with a reception terminal over a network, which includes:

encoding a predetermined number of packets and transmitting the encoded packets to the reception terminal over the network;

measuring a state of the network; and determining the predetermined number by using characteristics to be guaranteed in regard to delay time required for a packet transmitted from the transmission terminal to arrive at the reception terminal and the state of the network, wherein the characteristics to be guaranteed include a maximum allowable delay value that is a maximum value allowed for the delay time and a probability of the maximum allowable delay value being guaranteed; and wherein in the determining, the predetermined number of packets is determined such that the maximum allowable delay value and the probability of the maximum allowable delay value being guaranteed are satisfied.

10. The communication method according to claim 9, wherein the measuring comprises measuring a packet round trip time between the transmission terminal and the reception terminal, a packet loss rate, a transmission bandwidth, and a packet size; and the determining comprises determining the predetermined number of packets based on the measured round trip time, packet loss rate, transmission bandwidth, and packet size.

11. The communication method according to claim 9, wherein the transmitting comprises transmitting an acknowledgement packet to the transmission terminal when the reception terminal successfully decodes the predetermined number of encoded packets received from the transmission terminal; and the measuring comprises using information contained in the acknowledgement packet to measure the state of the network.

12. The communication method according to claim 9, wherein the encoding comprises encoding the predetermined number of packets by using rateless coding.

13. A non-transitory computer readable medium having stored thereon a program that causes a computer provided in a transmission terminal that communicates with a reception terminal over a network to execute the processes of:

encoding a predetermined number of packets and transmitting the encoded packets to the reception terminal over the network;

measuring a state of the network; and determining the predetermined number by using characteristics to be guaranteed in regard to delay time required for a packet transmitted from the transmission terminal to arrive at the reception terminal and the state of the network, wherein the characteristics to be guaranteed include a maximum allowable delay value that is a maximum value allowed for the delay time and a probability of the maximum allowable delay value being guaranteed; and wherein in the process of determining, the predetermined number of packets is determined such that the maximum allowable delay value and the probability of the maximum allowable delay value being guaranteed are satisfied.

14. The non-transitory computer readable medium according to claim 13, wherein the process of measuring comprises measuring a packet round trip time between the transmission terminal and the reception terminal, a packet loss rate, a transmission bandwidth, and a packet size; and the process of determining comprises determining the predetermined number of packets based on the measured round trip time, packet loss rate, transmission bandwidth, and packet size.

15. The non-transitory computer readable medium according to claim 13, wherein the process of transmitting comprises transmitting an acknowledgement packet to the transmission terminal when the reception terminal successfully decodes the predetermined number of encoded packets received from the transmission terminal; and the process of measuring comprises using information contained in the acknowledgement packet to measure the state of the network.

16. The non-transitory computer readable medium according to claim 13, wherein the process of encoding comprises encoding the predetermined number of packets by using rateless coding.

* * * * *

UNITED STATES PATENT AND TRADEMARK OFFICE
CERTIFICATE OF CORRECTION

PATENT NO. : 9,954,752 B2
APPLICATION NO. : 15/027350
DATED : April 24, 2018
INVENTOR(S) : Yuki Hayashi, Jun Suzuki and Masaki Kan Page 1 of 1

It is certified that error appears in the above-identified patent and that said Letters Patent is hereby corrected as shown below:

In the Specification

Column 15, Reference Signs list, Line 61; after "buffer", insert:
--¶23, 123 Encoded packet reconstruction unit--

Signed and Sealed this
Twenty-ninth Day of January, 2019

Andrei Iancu
*Director of the United States Patent and Trademark Office*